March 13, 1962 E. J. MACHAIN ETAL 3,025,386
WELDING APPARATUS
Filed July 30, 1959 6 Sheets-Sheet 1

Inventors
John N. Pappas
Eugene J. Machain
By their Attorney
George C. Fuller

March 13, 1962  E. J. MACHAIN ETAL  3,025,386
WELDING APPARATUS

Filed July 30, 1959

March 13, 1962  E. J. MACHAIN ETAL  3,025,386
WELDING APPARATUS
Filed July 30, 1959  6 Sheets-Sheet 4

March 13, 1962 E. J. MACHAIN ETAL 3,025,386
WELDING APPARATUS

Filed July 30, 1959 6 Sheets-Sheet 5

United States Patent Office 3,025,386
Patented Mar. 13, 1962

3,025,386
WELDING APPARATUS
Eugene J. Machain, Manchester, and John N. Pappas, Medford, Mass., assignors to United Shoe Machinery Corporation, Flemington, N.J., a corporation of New Jersey
Filed July 30, 1959, Ser. No. 830,561
1 Claim. (Cl. 219—125)

This invention relates to welding apparatus and more particularly to apparatus for forming a welded joint by applying welding heat at an operating point to an elongated, fusible, metal insert supported between the parts to be joined and transferring said point along said insert. The invention is disclosed as embodied in apparatus for producing an annular weld to form an omega seal between portions of an atomic reactor, for example, between a standpipe and the main housing of a control rod drive mechanism. However, the invention is not limited to such use.

An omega seal is a hermetic closure between two parts such as the standpipe and the mechanism referred to above, which parts are usually mechanically supported in fixed relation by means other than the seal. The seal resembles a tube which has been slit and has had the cut edges secured to the parts. As seen in cross section, the form of the complete seal approximates that of the Greek capital letter "omega" in having two arms integrally joined in a loop.

The province of the omega seal is, firstly, to provide a hermetic seal between the parts; secondly, to provide flexibility to accommodate thermal expansion; and thirdly, to facilitate unsealing and resealing, for example, for reloading purposes. Conveniently therefore for assembly, the seal is initially in two pieces as if the seal had been slit along the middle of the loop portion leaving two pieces corresponding in cross section to the two arms. For an annular seal, the two pieces are called seal rings. Each ring is either formed integrally with a part or is bonded, as by welding, to one of the parts to be sealed in either case leaving an upstanding loop portion terminating in a lip. When the parts are assembled, the lips are adjacent and may be welded together to close the loop and form the seal. It is this weld which is termed the seal weld.

As disclosed herein, an omega seal weld is formed by progressively fusing, by means of an electric arc torch, a weld metal insert supported between two seal rings placed with their lips in alinement with a small opening therebetween. Advantageously, the insert is somewhat narrower than the opening and embodies shoulder means by which the insert is supported in the opening with its top at a predetermined height above the lips. This predetermined relative disposition of the insert and lips insures that, upon fusing of the insert, together with the lips of the portions to be welded, proper filling of the opening is achieved without excessive sagging and that at the bottom of the opening a suitable root of the weld is formed. Conveniently, the shoulder means are formed by crimping the insert at intervals along its length to a predetermined depth corresponding to the desired height of the insert above the lips of the parts to be welded. Advantageously, the fusion is accomplished with an inert gas shielded electric arc torch. It was found in practice that the magnetic field produced in starting the torch and shrinkage of the weld metal during the progressive formation of the weld between the parts to be joined tended to displace the insert and as a result the quality of the weld was impaired.

It is accordingly an object of the present invention to provide improved welding apparatus adapted for consumable insert welding whereby displacement of the consumable insert during welding is prevented.

To this end and in accordance with a feature of the invention, there is provided welding apparatus for welding together two objects each having a metallic lip to be welded to a lip of the other by the progressive fusion of a consumable metal insert supported on shoulder means between the lips, said apparatus comprising a welding torch mounted for movement along said insert in operative welding relation thereto, and means operative at intervals spaced along the insert for applying pressure to said insert to retain unfused portions of said insert in said predetermined heightwise relation to the lips.

In the illustrative embodiment of the invention, the welding apparatus comprises a circular base adapted to be fastened to a reactor standpipe and carrying a cage rotatable about the standpipe and control rod drive housing, a torch mounted on the cage and carried thereby through a circular path in welding relation to a consumable insert disposed between the lips of an omega seal concentric with the standpipe, and a plurality of spring loaded insert retaining rolls carried by the cage for bearing upon the insert at circumferentially spaced locations, including two adjacent to the torch, whereby the insert is pressed into the opening between the lips until the crimping of the insert prevents further movement. Accordingly, the insert is maintained during the weld in accurately predetermined disposition relative to the lips, thus facilitating the formation of a high-quality weld.

Other features and advantages of the invention will best be understood from the following description taken in connection with the accompanying drawings in which.

Figure 1:
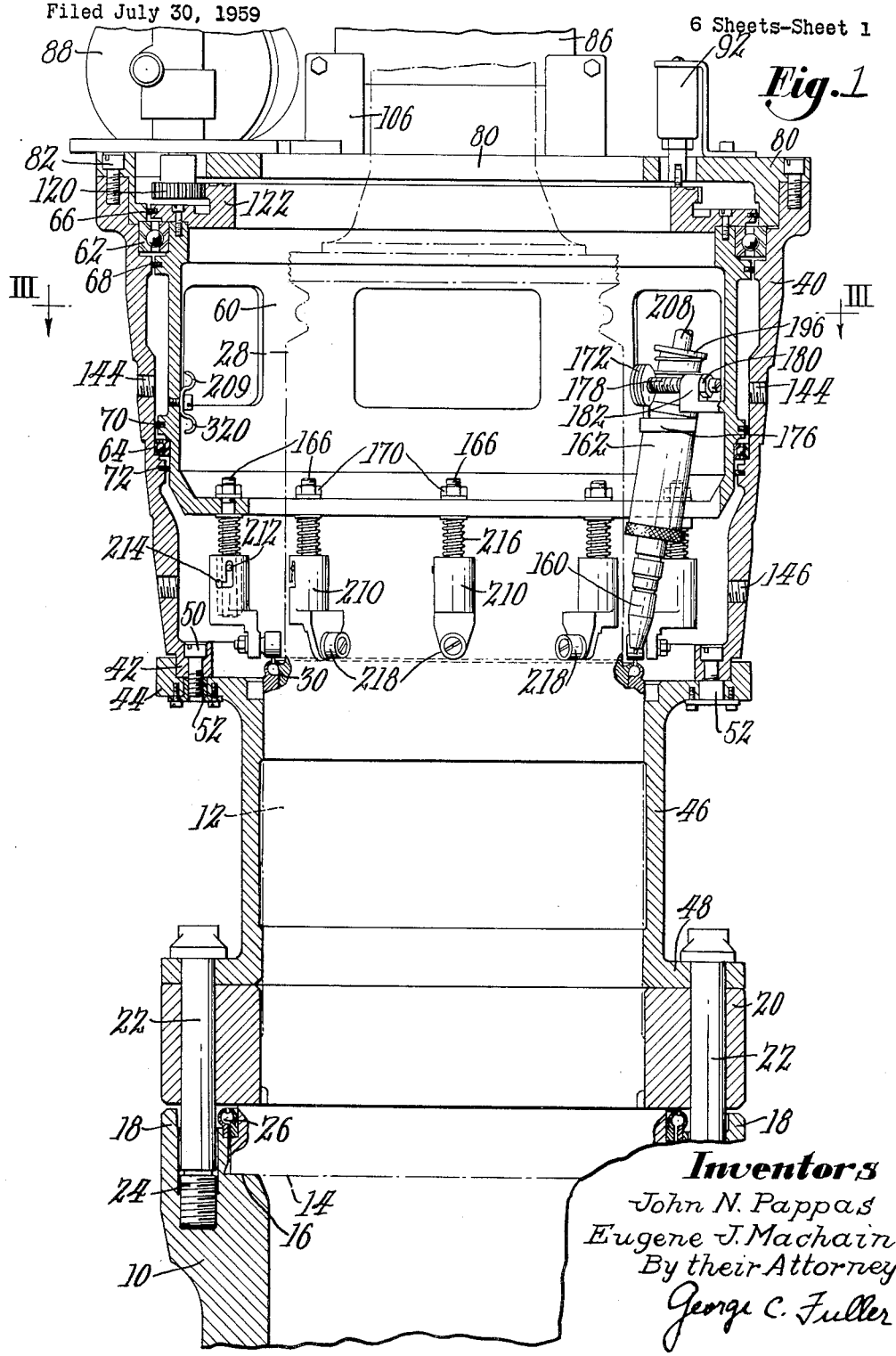
FIG. 1 is a vertical diametrical section taken on line I—I of FIG. 2, illustrating apparatus embodying the present invention disposed for welding an omega seal between parts of an atomic reactor.

Referring to the drawings, FIG. 1 illustrates the apparatus of the present invention disposed for making an omega seal weld between the upper mechanism and unit cell of a control rod drive mechanism. From the top of an S3G reactor extends a plurality of standpipes one of which is designated in FIG. 1 by the numeral 10. The standpipe is adapted to receive a unit cell 12 of a control rod drive mechanism, a flange 14 of the cell seating upon a shoulder 16 of the flanged rim 18 of the standpipe. In installed position, the control rod drive mechanism is secured in position by a clamp ring 20 which is secured to the standpipe by eighteen clamp ring bolts 22 which pass through equally spaced holes in the clamp ring 20 and into threaded clamp ring bolt holes 24 in the standpipe.

Adjacent the flange 14, the unit cell 12 of the control rod drive mechanism is sealed to the standpipe by an omega seal 26. At the upper part of the drive mechanism, a main housing 28 (shown in phantom in FIG. 1) is sealed to the unit cell 12 by another omega seal 30.

The apparatus of the present invention which is adapted for welding the seals 26 and 30 comprises an annular outer frame 40 the bottom rim 42 of which is adapted to mate either with the flanged rim 18 of the standpipe or with the upper flanged rim 44 of an adapter ring 46 having four legs terminating in the perforated foot portions 48 by which the ring 46 may be bolted to the standpipe with four of the clamp ring bolts 22. The frame 40 is fastened to the adapter ring 46 by screws 50 which pass through holes in the rim 42 and threadedly engage threaded inserts 52 in the rim 44 of the adapter ring.

Inside the frame 40, an inner cage 60 is mounted for rotation on a vertical axis by means of upper and lower ball bearings 62, 64 respectively. The upper bearing 62 is protected by dust shields 66 and 68 while the lower bearing is protected by dust shields 70 and 72.

At the top of the frame 40 is attached a mounting cover 80 which provides support for various assemblies that move and control the action of the cage 60. The cover 80 is attached to the frame by five cover cap screws 82 and three eyebolts 84 (FIG. 2) which threadedly engage eight tapped holes uniformly spaced around the top rim of the frame 40. Supported on the cover 80 are an electric junction box 86, an electric drive unit 88 connected to the box 86 by a cable 90, inner and outer limit switches 92, 94 connected to the box 86 by leads 96 and 98, respectively, and a terminal block box 100. The limit switches are attached to the cover by screws 102 which pass through slots in bracket portions 104, which means of attachement provides for circumferential adjustment of the positions of the limit switches. The junction box 86 is attached to the cover by means of brackets 106 which are fastened to the cover by screws 108 while the terminal block box 100 has flanges 110 fastened to the cover by screws 112. The electric drive unit 88 is secured to the cover by two motor mount plate binding screws 114.

The motor drive unit 88 provides power to drive the inner cage 60 to give a constant speed of travel. For this purpose the unit 88 has an output pinion 120 which engages an azimuth gear 122 fastened to the top of the inner cage by screws 124, which arrangement also holds the upper ball bearing set 62 in position against the inner cage.

Figure 9:
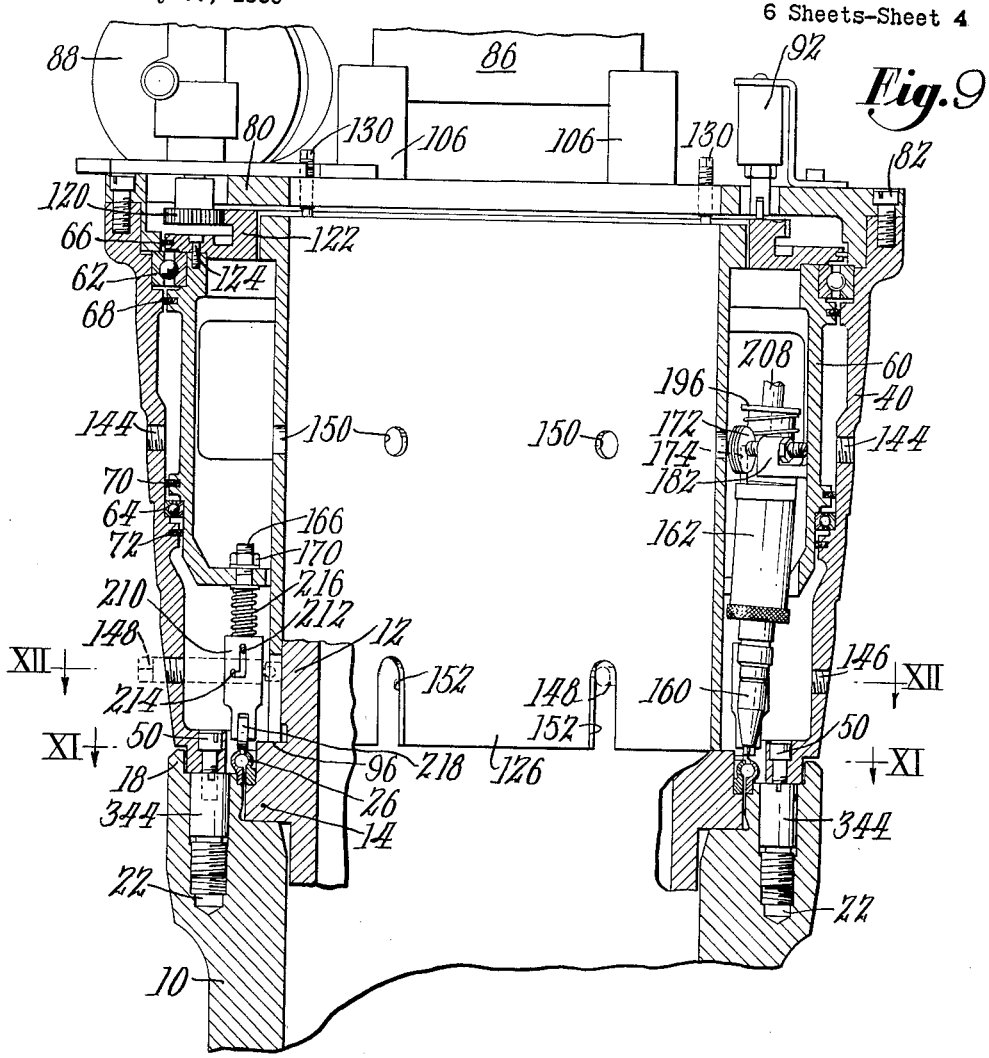
FIG. 9 is a vertical diametrical section of the apparatus of FIG. 1 adapted for welding a seal between other parts of a reactor.

An opening in the center of the mounting cover 80 provides sufficient clearance to permit the welding apparatus to be placed over the unit cell 12 as shown in FIG. 9.

In making the lower weld as in FIG. 9, a holddown sleeve 126 is employed to clamp the flange 14 of the unit cell 12 against the shoulder 16 to hold the cell in fixed relation to the standpipe. The sleeve 126, when used, is normally supported by the cover 80 by three holddown sleeve cap screws 128 (FIG. 2) equally spaced about the inner rim of the cover and threadedly engaging the top of the sleeve 126. Interspersed with the cap screws 128 are three holddown sleeve swivel pad clamp screws 130 which pass through the cover in threaded engagement therewith and are adapted to bear upon the top of the sleeve 126. In applying pressure to the flange 14, the cap screws 128 are backed off while the clamp screws 130 are tightened.

Figure 2:
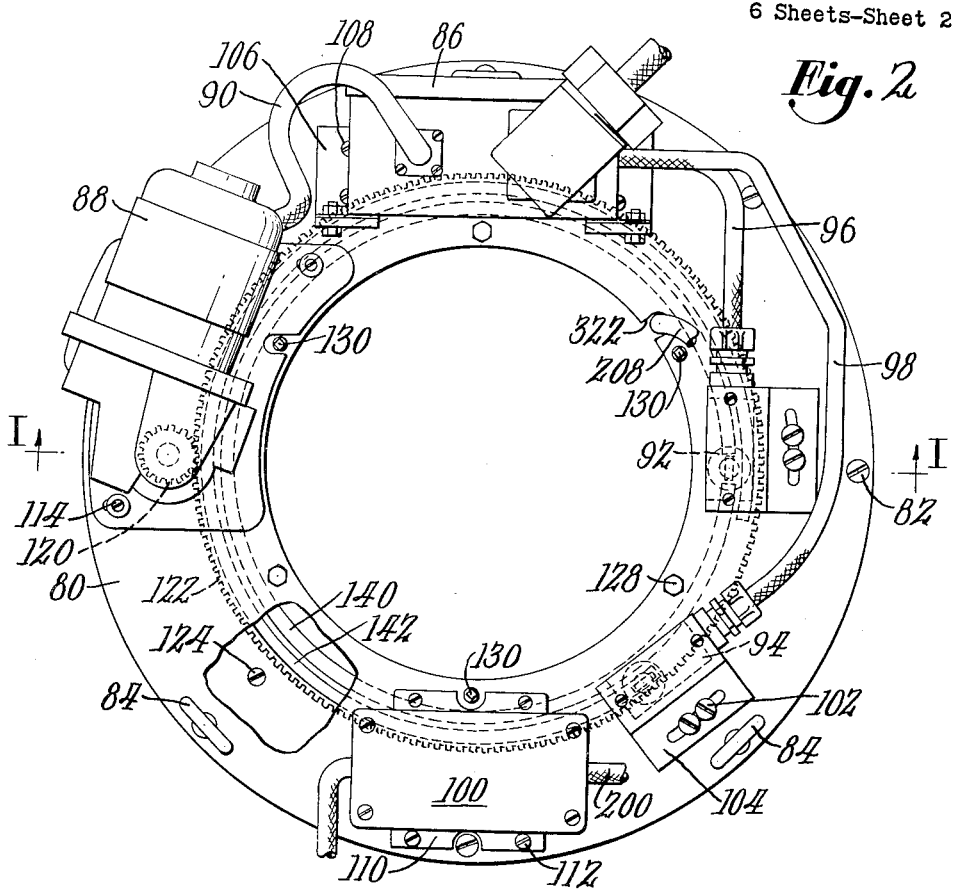
FIG. 2 is a plan view, partly broken away, of the apparatus shown in FIG. 1.
Figure 3:
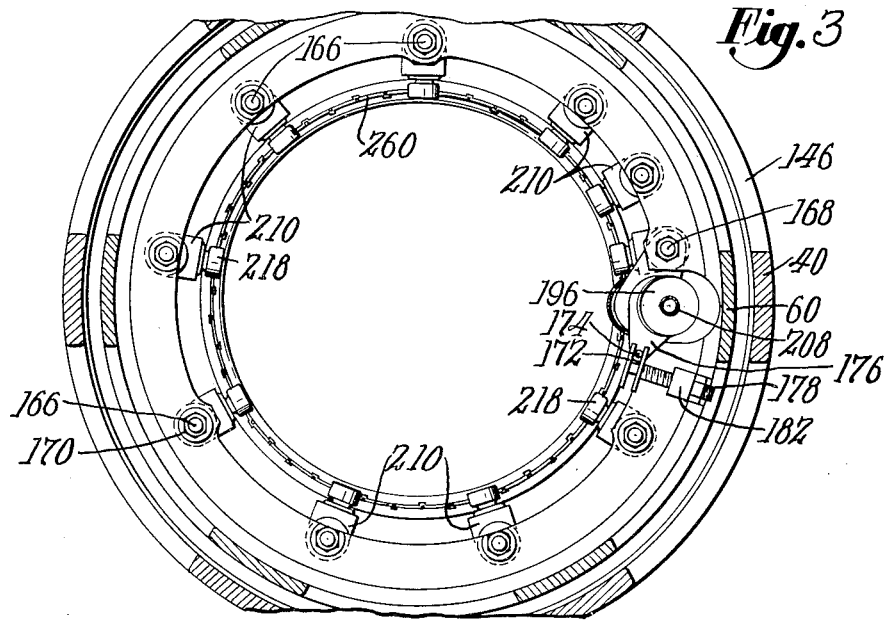
FIG. 3 is a partial horizontal section taken on line III—III of FIG. 1.

Two cam tracks, an inner track 140 and an outer track 142, are formed in the upper surface of the azimuth gear 122 (see FIG. 2). By means of these tracks, the azimuth gear cooperates with the limit switches 92 and 94 for providing switching action as a function of the rotational position of the cage 60 to provide control of the welding cycle as hereinafter more fully described.

An upper set of six threaded holes 144 and a lower set of similar holes 146 provide for the insertion of threaded jack screws 148 (FIG. 9) through the frame and through holes 150 or slots 152 in the sleeve 126 should adjustment of the upper mechanism assembly for concentricity be necessary prior to welding.

Figure 7:
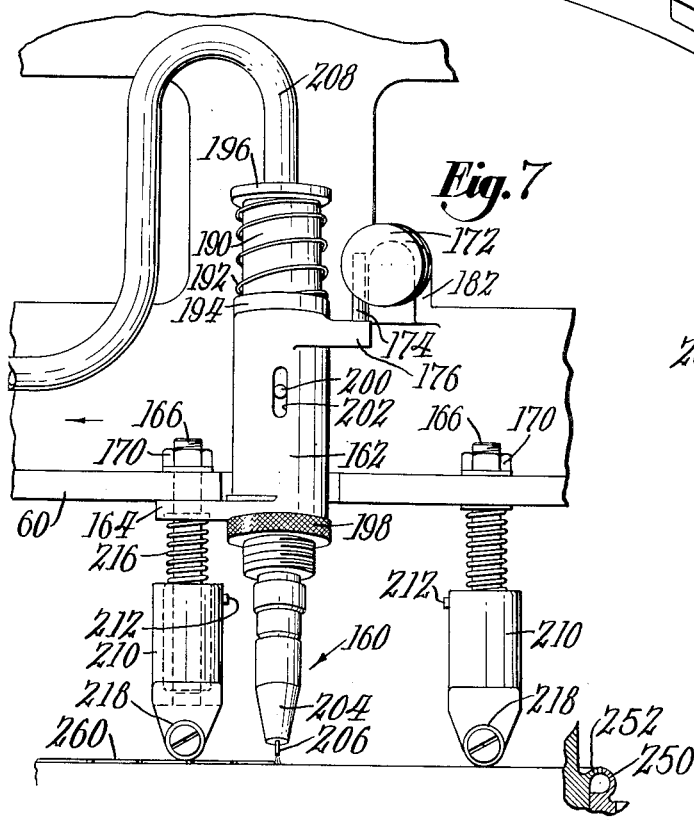
FIG. 7 is an elevation of a portion of the apparatus of FIG. 1.

The inner cage 60 supports a welding torch 160 mounted in a tubular torch carrier 162. From the base of the carrier 162 extends a boss 164 (FIG. 7), the carrier 162 being swingably mounted to the bottom rim of the cage 60 by a carriage housing stud 166 or by a lower carrier stud 168 (FIG. 14) passing through the rim and boss and secured by a stud nut 170.

Adjustment of the radial position of the carrier 162 about its stud mounting is provided by a double flanged radial adjustment wheel 172 which engages a pin 174 mounted in a boss 176 at the upper end of the carrier 162. The wheel 172 is fast on a threaded shaft 178 which is threaded through a bracket 182 extending inwardly of the cage 60 and is locked in position by a jam nut 180.

Slidable in the torch carrier 162 is a sleeve 190 which is urged upwardly with respect to the carrier by a spring 192 the bottom end of which bears on a spring retaining washer 194 while the upper end bear against a flange 196 formed in the upper end of the sleeve 190. The lower end of the sleeve 190 is threaded to receive an adjusting knob 198 rotation of which provides adjustment of the vertical position of the sleeve. The sleeve 190 carries a pin 200 while the carrier is formed with a slot 202 providing limited vertical movement of the sleeve. The torch 160 is secured in the sleeve 190 and is an air cooled Linde, type HW-9, using a No. 4 ceramic gas cup 204 in which is held a thoriated centerless ground tungsten electrode 206. The torch is supplied with electric power and argon gas through a composite power cable and hose assembly 208. This cable comprises a plastic tube and a stranded conductor, the tube acting as both the inert gas tubing and an insulator for the conductor. The cable 208 extends from the torch to the terminal block box 100 with sufficient slack held in clips 209 (FIG. 1) to accommodate rotation of the cage.

Figure 14:
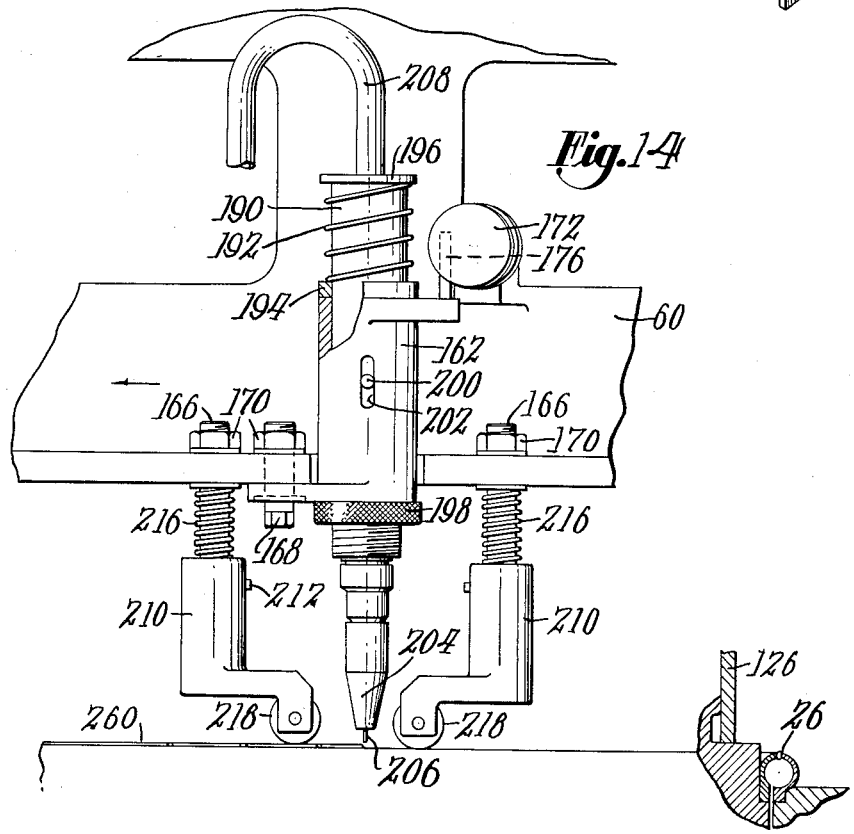
FIG. 14 is an elevation of a portion of the apparatus shown in FIG. 9.

For retaining a consumable metal insert in position in forming a weld, holddown means supported by the cage 60 are provided adjacent its bottom rim. The holddown means comprise a plurality of carriage housings 210 slidably mounted on housing studs 166 on which they are retained by pins 212 operating in slots 214 of the housings. The housings 210 are spring loaded downwardly from the rim of the cage 60 by springs 216, the upper ends of which bear against the bottom of the rim while the lower ends are seated on an interior shoulder of the housing. At the bottom of each housing is mounted a roll 218 in a manner to provide for engagement of the roll with an insert mounted between the rings to be sealed. For making the upper weld, all the rolls 218 are provided with a carriage housing mounting which offsets the rolls toward the center of the cage. For making the lower or standpipe weld, because of its larger diameter, all but two of the housings provide a non-offset support for the rolls. The two exceptions are the two housings adjacent the torch 160 where circumferentially offset housings are provided to bear upon the insert adjacent the electrode (FIG. 14).

Figure 4:
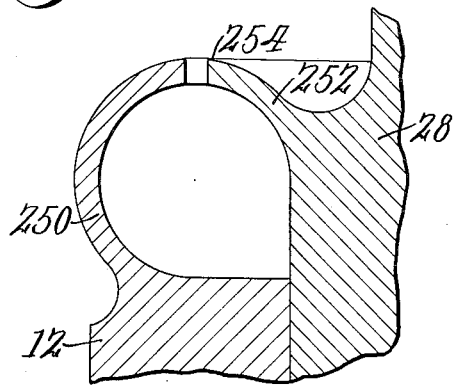
FIG. 4 is a partial vertical section transverse of an omega seal shown in FIG. 1 with lips prepared for welding.
Figure 5:
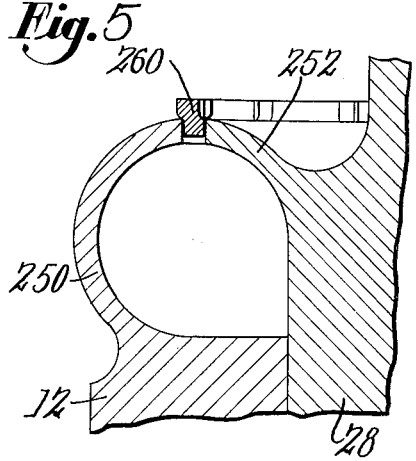
FIG. 5 is a partial section of the seal portion of FIG. 4 with a consumable insert positioned between the lips.
Figure 6:
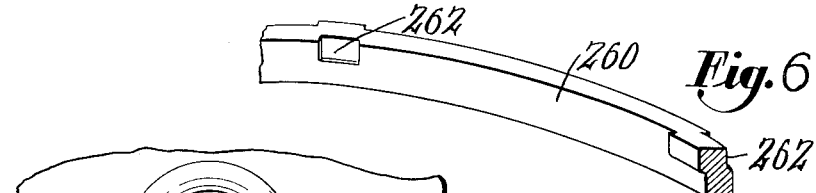
FIG. 6 is an angular view partly in section of a portion of a consumable welding metal insert.
Figure 8:
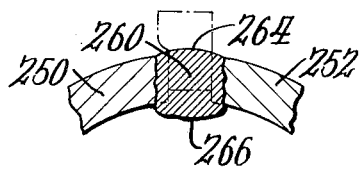
FIG. 8 is a partial transverse section of an omega seal after welding.

FIG. 4 shows in greater detail the members of the upper seal shown in FIG. 1. In this construction the seal rings 250 and 252 are integral with the parts 12 and 28 to be joined and terminate in lips 254. In welding disposition, the lips present opposed parallel surfaces suitably spaced about 0.055" for lips 0.060" thick. In welding, a consumable metal insert 260 is inserted between the lips 254 and the insert and lips fused together. The insert is fabricated from a metal compatible with the seal rings, suitably in the case of the illustrative application both the seal rings and the insert being of series 300 stainless steel. The insert is preferably narrower than the gap between the lips 254 and for a gap of 0.055" is suitably approximately 0.045" wide. The insert is prevented from falling through the gap by crimps 262 formed at intervals along the insert. The crimps also support the insert in predetermined heightwise relation to the lips, in the illustrative case extending about 0.035" above the lips of the rings 250, 252 which are about 0.060" thick, so that upon fusion of the insert an optimum weld surface 264 and root 266 are formed (FIG. 8). The insert 260 is formed in the shape of a ring by forming a wire to the appropriate cross section and welding the ends together.

Figure 15:
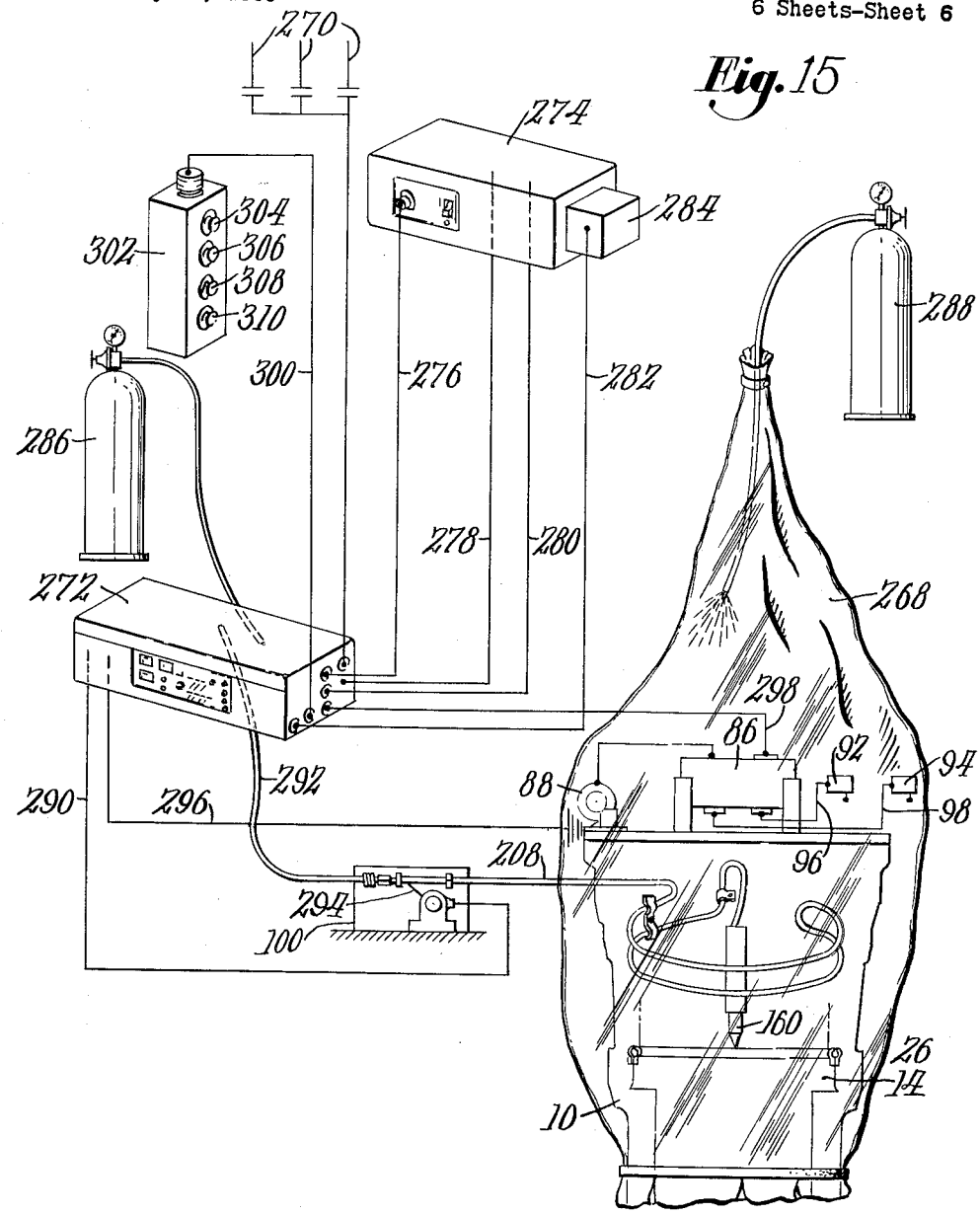
FIG. 15 is a diagram of supply and control arrangements for the apparatus.

FIG. 15 shows diagrammatically the external connections to the welding machine for supplying electric power to the motor drive unit 88, welding current and inert gas to the torch 160, and inert gas to a plastic envelope 268 which is disposed around the welding machine during welding. Since these external connections and controls involve no part of the present invention and may be obtained commercially, only sufficient description thereof will be given here to afford an understanding of the operation of the welding machine. Referring to FIG. 15, electric power is supplied from mains 270 to a welding control unit 272 comprising a welding power source control, a high frequency generator, electronic motor controls, sequencing and gas controls. The control unit 272 is connected to a welding power source 274 by a cable 276 by which power is supplied to the source 274, by two cables 278 and 280 by which welding energy is returned to the control unit 272, and by a control cable 282 supplying energy for controlling a current adjustment unit 284 of the power source 274. Argon gas for supplying the torch is furnished from a source 286 to the control unit 272 while a separate source of argon 288 is employed to supply inert gas to the envelope 268. A negative cable 290 connected between the control unit 272 and the terminal block box 100 carries welding electric current for the torch while argon gas from the unit 272 is supplied to the box 100 through a tube 292. In the terminal block box 100, a cable adapter 294 connects the cable 290 and tube 292 with the hose and power cable assembly 208. Another welding current cable 296 provides the positive conductor between the welding machine and the control unit. A further cable 298 provides electric energy to the motor drive unit 88 and connects the limit switches 92 and 94 to the control unit. The control unit 272 is connected by a cable 300 to an operator's remote control panel 302 having four switches, a weld-no weld switch 304, a manual-automatic switch 306, a forward or reverse switch 308 for the drive motor and a start switch 310.

In performing the upper weld as shown in FIG. 1, four clamp bolts 22 are removed from the clamp ring and the adapter ring 46 is lowered over the upper mechanism assembly and the main housing 28 and into position so that the four holes in the adapter ring base are brought over the four empty bolt holes in the clamp ring. The four clamp ring bolts are assembled to the standpipe binding the adapter ring onto the clamp ring. The torch carrier adjusting knob is turned to raise the torch to its uppermost position and the welding machine, with all the insert retaining rolls in the down position, is lowered over the upper mechanism assembly and into place on the adapter ring. The screws 50 are inserted into place in the adapter ring and tightened. The two motor mount plate binding screws are loosened and the drive unit slid outward to disengage its pinion gear from the azimuth gear on the inner cage. The power cable and hose assembly is loaded into the clips 320 on the inside of the inner cage turning the cage manually counterclockwise while feeding the power cable and hose assembly down through a slot 322 on the inside rim of the cover. An electrode tip is alined over the center of the insert and adjusted to bring the tip about .030" above the insert. The motor drive unit is then slid in to engage its pinion gear with the azimuth gear and the screws 114 are tightened. The plastic gas envelope is disposed around the welding machine and secured around the base of the machine. The top of the plastic envelope is gathered around the hoses and cables and sealed with pressure-sensitive adhesive tape. Argon gas is then supplied to the envelope at 115–125 c.f.h. for 20 minutes to provide a prewelding purge. During welding the flow is reduced to 55–65 c.f.h. Thereafter, using the switches of the remote control panel 302, the operator orients the torch into starting position and initiates the welding cycle which proceeds under the control of the unit 272 which terminates automatically.

During the welding cycle, the clearance between the insert 260 and the lips 254 of the seal rings provides for the passage of argon gas from the torch into the hollow of the seal thereby protecting the root of the weld to which the purge gas would otherwise have difficult access.

Figure 10:
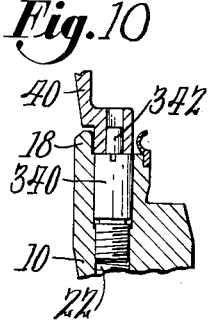
FIG. 10 is a partial section taken on line X—X of FIG. 11.

The operation of making the lower weld, as shown in FIG. 9, is similar with the exception of the mounting of the frame 40 on the standpipe 10. For this weld, the clamp ring 20 is removed and two standpipe locating plugs 340 (FIG. 10) are inserted in two diametrically opposed clamp ring bolt holes 22. Each plug is provided at its top with a locating pin 342 which cooperates with a mating hole in the bottom of the frame 40 for facilitating orientation of the frame on the standpipe. In other holes 24 clamp studs 344 are inserted which have threaded holes for receiving the holddown screws 50 which are tightened.

Figure 11:
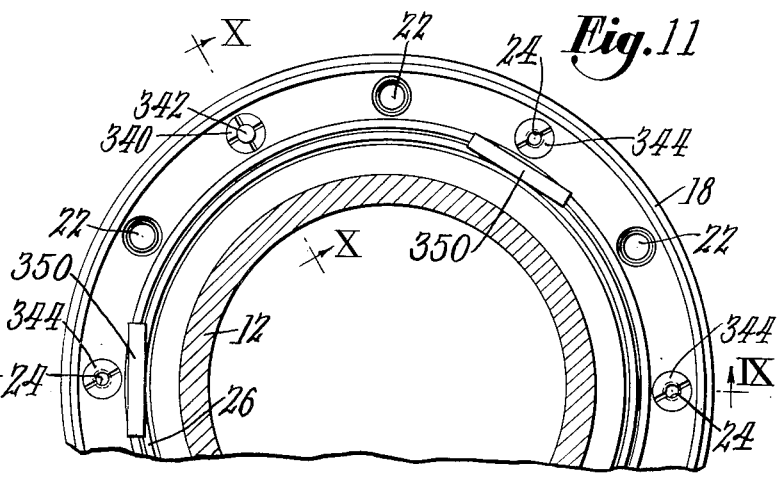
FIG. 11 is a horizontal section taken on line XI—XI of FIG. 9 with the welding apparatus removed.
Figure 12:
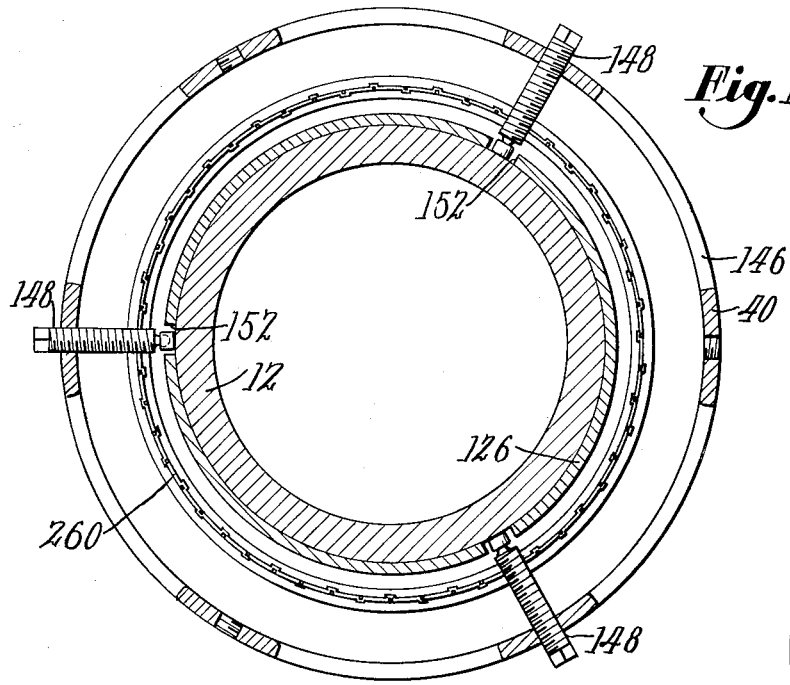
FIG. 12 is a horizontal section taken in line XII—XII of FIG. 9.
Figure 13:
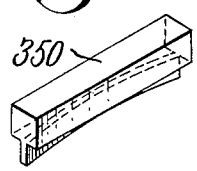
FIG. 13 is an enlarged angular view of a gage shown in FIG. 11.

The operation of installing a consumable insert 260 between the lips of the seal rings of a seal prior to installation of the welding machine entails first checking the concentricity of the rings. This is facilitated by spacer gages 350 (FIG. 13). If the parts are not concentric, the assembly is shifted until a plurality of gages 350 can be inserted between the lips as shown in FIG. 11. Then the insert, previously checked for flatness and cleaned, is progressively placed between the lips while the gages are correspondingly removed. Adjustment for concentricity of the parts after installation of the machine may be effected by the jackscrews 148.

Having thus described our invention, what we claim as new and desire to secure by Letters Patent of the United States is:

In a welding machine, in combination, a frame, a cage mounted within the said frame for rotation about a fixed axis, power means carried by the frame and connected to the cage for effecting rotation thereof, the frame being adapted for attachment to a work part with said cage disposed in coaxial relation to a circular seal to be formed by means of a consumble insert between said work part and another such part, said cage having a rim extending in a plane parallel to and spaced from the plane of said seal, a plurality of housing studs extending from said rim toward the plane of said seal, a plurality of carriage housings slidably mounted on said studs, a roll carried by each carriage housing, the rolls being so mounted as to engage a consumable insert for the seal when said housings are in an extended position on their studs, spring means for biasing each carriage housing to an extended position on its stud, and a pin fixed to each stud within an L-shaped slot in each carriage housing for retaining said carriage housings on the studs and to permit retention of the carriage housings with their rolls in disengaged position relative to the insert.

References Cited in the file of this patent
UNITED STATES PATENTS

| | | |
|---|---|---|
| 1,604,180 | Lincoln | Oct. 26, 1926 |
| 1,884,714 | Jerabek | Oct. 25, 1932 |
| 1,950,393 | Boardman | Mar. 13, 1934 |
| 1,954,773 | Champion et al. | Apr. 10, 1934 |
| 2,777,937 | Bryant | Jan. 15, 1957 |
| 2,794,112 | Crow | May 28, 1957 |